(12) United States Patent
Dent

(10) Patent No.: US 6,963,532 B1
(45) Date of Patent: *Nov. 8, 2005

(54) COMMUNICATION SYSTEM AND METHOD WITH ORTHOGONAL BLOCK ENCODING

(75) Inventor: Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 888 days.

This patent is subject to a terminal disclaimer.

(21) Appl. No.: 09/707,590

(22) Filed: Nov. 7, 2000

Related U.S. Application Data

(63) Continuation of application No. 08/898,392, filed on Jul. 22, 1997.

(51) Int. Cl.[7] ............................................. H04J 11/00
(52) U.S. Cl. ...................................... 370/208; 370/335
(58) Field of Search ................................ 370/208, 342, 370/203, 209, 320, 335; 375/130, 137

(56) References Cited

U.S. PATENT DOCUMENTS 5,537,416 A * 7/1996 MacDonald et al. ........ 714/748
6,215,762 B1 * 4/2001 Dent ........................... 370/208

* cited by examiner

Primary Examiner—Chi Pham
Assistant Examiner—Alexander O. Boakye
(74) Attorney, Agent, or Firm—Coats & Bennett, P.L.L.C.

(57) ABSTRACT

A communication system and method with orthogonal, block encoding is provided. Encoded signals are transmitted by repeating transmissions of symbol blocks with a phase or sign change selected for each block from a sequence of phase or sign changes. Different symbols are transmitted using orthogonal sequences. The decoding uses different orthogonal sequences for separating the received encoded signals into corresponding separate channels. The orthogonal encoding is removed from the encoded transmitted signals and corresponding ones of the repeated symbols are added in successively received repeated blocks after the orthogonal encoding is removed. A transmitter uses a digital source encoder to encode information into symbols, and each symbol is repeated a preselected number of times to successively produce groups of repeated bits. Each repeat bit is changed in phase or sing by application of a sign or phase change determined by a selected assigned orthogonal code associated with the transmitter. The sign changed bits are interleaved from a number of such groups to successively generate a number of blocks, each composed of the different sign or phase changed bits of the preselected number of repeated groups and having a collective sign or phase change corresponding to a common sign change or phase shared by all bits of the block. The interleaved blocks then modulate a radio signal for transmission.

7 Claims, 8 Drawing Sheets

COMMUNICATION SYSTEM AND METHOD WITH ORTHOGONAL BLOCK ENCODING

This is a continuation of U.S. patent application Ser. No. 08/898,392, filed Jul. 22, 1997.

BACKGROUND OF THE INVENTION

The present invention relates generally to a communication system and method with transmittal signal encoding and particularly to an orthogonal communication method employing orthogonal encoding.

Deliberate bandwidth expansion, by redundant coding, is presently employed because of the advantage it confers on the parameters of performance. However, this advantage can be lost if the communication channel suffers from delayed echoes, time-dispersion or multipath effects.

Code Division Multiple Access, or CDMA, is a known technique often proposed to artificially widen transmission bandwidths. CDMA is an extension of well known redundant coding techniques such as the technique of repeat transmissions with majority vote at the receiver to combine signal repeats. In some applications of CDMA, also known as Direct Sequence Spread Spectrum, a mixture of simple repeats, or "dumb spreading," and error correction coding, or "intelligent spreading," is employed to achieve desired bandwidth widening ratio.

It is known in the prior art that it is advantageous to use less intelligent coding and to substitute an element of dumb spreading in such a way that different signals become orthogonal to one another and then do not interfere with each other. For example, if one signal after a suitable amount of intelligent error correction coding yields a coded bit stream $a_1, a_2, a_3, a_4 \ldots$ and a second signal yields a coded bit stream $b_1, b_2, b_3, b_4$.

Then the first signal is transmitted using additional four-times repeat coding as $a_1, a_1, -a_1, -a_1, a_2, a_2, -a_2, -a_2, a_3, a_3, -a_3, -a_3, a_4, a_4, -a_4, -a_4 \ldots$ while the second signal is transmitted with four times repeat coding as $b_1, -b_1, -b_1, b_1, b_2, -b_2, -b_2, b_2, b_3, -b_3, -b_3, b_3, b_4, -b_4, -b_4, b_4 \ldots$, then a comparison of the sign pattern of the repeat coding ++−−++−−++−−++−− ... for the first signal and the sign pattern of the repeat coding +−−++−−++−−+ ... for the second signal, shows that these differ in sign in exactly half the positions while agreeing in the other half. Thus, upon combining the repeats with the proper signs for enhancing one signal, the contribution from the interfering signal completely cancels, and vice versa. These signals are known as "mutually orthogonal."

The U.S. digital cellular IS95 system specifies mutual orthogonality for transmissions from cellular base stations to mobile phones, using 64-fold repeat coding with one of 64 sign patterns selected from a set of 64 mutually orthogonal Walsh-Hadamard codes. The IS95 system uses non-orthogonal transmission in the direction from mobile phone to cellular base stations, using instead intelligent error correction coding comprising convolutional encoding concatenated with orthogonal Walsh-Hadamard block coding. In the mobile-to-base direction, the orthogonality between different Walsh-Hadamard codes is used to discriminate between different 6-bit symbols transmitted from the same mobile phone, while in the base-to-mobile direction, the Walsh-Hadamard codes are used to discriminate between symbols transmitted to different mobile phones.

A disadvantage of the IS95 system of non-orthogonal transmissions in the mobile-to-base direction is that these signals interfere with one another if the power of the mobile transmitter is not strictly controlled as a function of distance from the base station such that signals from different mobile phones are received at more or less the same power level. However, the need for strict power control is alleviated when practicing the invention disclosed in U.S. Pat. No. 5,151,919 issued to Dent on Sep. 29, 1992, entitled *CDMA Subtractive Demodulation*. In U.S. Pat. No. 5,218,619 issued to Dent on Jun. 8, 1993, entitled *CDMA Subtractive Demodulation*, already decoded signals are subtracted more than once to improve interference subtraction. U.S. Pat. No. 5,353,352 issued to Dent and Bottomley on Oct. 4, 1994, entitled *Multiple Coding for Radio Communications*, describes optimum spread spectrum access codes, equivalent to the sign patterns discussed above, when orthogonal signaling is employed within one transmission with non-orthogonality between different transmissions, such as used in an IS95 uplink in the mobile-to-base direction. The disclosures of the above referenced patents are hereby incorporated by reference here in their entirety.

The reason for the difference between IS95 uplink, (mobile-to-base), and IS95 downlink, (base-to-mobile), transmission schemes is that maintaining orthogonality between different transmissions requires that they be accurately aligned in time, when the prior art communication schemes are used. If, in the above example, the first and second signals are aligned with one another with a one place shift they are shown as follows:

++−−++−−++−−++−−
+−−++−−++−−+

The two exemplary sign patterns given above are seen now to differ only at the beginning and the end of symbol blocks, thus severely compromising orthogonality.

In the downlink, or base-to-mobile, direction all signals originate at the same base station and thus time alignment can be assured. When signals in the uplink or mobile-to-base direction originate at different mobile phones that lie at different distances from the base station, it is much more difficult to achieve time alignment of the signals received at the base station.

The European cellular system known as GSM employs dynamic time alignment of mobile transmissions, wherein individual mobile phones are commanded by a base station to advance or retard their timing to bring the signals received into a desired time relationship with one another. However, the ability to achieve such synchronization to a high accuracy, for example within fractions of a microsecond, is limited by multipath signal propagation phenomenon which is a characteristic of the land-based mobile radio environment.

The multipath signal propagation phenomenon is caused by reflections of transmitted signals from large objects such as hillsides and tall buildings, giving rise to delayed echoes. While it may be possible to synchronize signals transmitted from a mobile transmitter such that a selected signal ray or echo is time aligned and thus orthogonal to a ray from another mobile transmitter, multipath propagation, reflected rays, or echoes, with path delays different from those of the selected signal rays will not be time aligned.

The GSM system uses Time Division Multiple Access (TDMA) in which each mobile signal is allocated a timeslot that does not overlap with transmissions from other mobiles on the same frequency. A guard time between slots equal to the longest normally expected echo delays, plus the use of commanded time advance/retard, reduces interference between different transmissions caused by multipath propagation. The interference of an echo with its original signal has been reduced by using an equalizer that beneficially adds together energy in different echoes of the same signal. One such equalizer is described, for example, in U.S. Pat. No. 5,331,666 issued to Dent on Jul. 19, 1994, entitled *Adaptive Maximum Likelihood Demodulator* and U.S. Pat. No. 5,335,250 issued to Dent, et al. on Aug. 2, 1994, entitled *Method and Apparatus for Bidirectional Demodulation of Digitally Modulated Signals*, the disclosures of which are hereby incorporated by reference herein. The need for a guard time between time slots reduces the bandwidth capability of the systems while use of an equalizer does not eliminate all potential multipath propagation problems.

A need therefore still exists for a system and method that constructs and communicates signals that remain largely orthogonal to each other even when delayed by different amounts of time due, for example, to multipath propagation phenomenon.

SUMMARY OF THE INVENTION

The deficiencies of the prior art described above are alleviated when practicing a communication system and method with orthogonal encoding in accordance with the present invention. The communication system and method of the present invention provides for repetitively transmitting encoded signals with mutually orthogonally encoded repeated blocks of symbols, the symbols in the repeated blocks representing coded information. Decoding of the orthogonally encoded repeated blocks of symbols of the transmitted encoded signal is provided.

In accordance with one aspect of the invention, a communication system is described with orthogonal block encoding and comprises a plurality of transmitters each with means for repetitively transmitting encoded signals with mutually orthogonally encoded repeated blocks of symbols respectively representing samples of an informational source signal produced at the transmitter. A receiver is provided for receiving the encoded transmitted signals including means for decoding the orthogonally encoded repeated blocks of symbols of the transmitted encoded signals received from all the plurality of transmitters. The decoding is provided by employing different ones of a plurality of orthogonal codes respectively associated with different ones of the plurality of transmitters for separating the received encoded signals into corresponding separate channels.

In yet another aspect of the invention, the communication system each of the plurality of transmitters may repeat each bit of information produced by a digital source encoder a preselected first number of times to successively produce groups of repeated bits. A sign change is selectively imposed on the repeated bits of each of a second number of successive groups of repeated bits in accordance with an orthogonal code associated with the transmitter.

Interleaving of the sign changed bits from the second number of groups is then carried out to successively generate a number of blocks equal to said first number containing said second number of symbols each block comprising different coded information bits sharing a common sign change. A modulated signal is transmitted in accordance with the generated blocks with sign changes corresponding to the orthogonal code.

These and other features and advantages of the present invention will become apparent from the following detailed description, the accompanying drawings, and the appended claims.

BRIEF DESCRIPTION OF THE DRAWINGS

In the drawings:

FIG. 8($b$) is an illustration like that of FIG. 8($a$) but showing the delay insensitive orthogonal CDMA transmission of data bits in accordance with the invention.

DETAILED DESCRIPTION OF THE INVENTION

Figure 1:
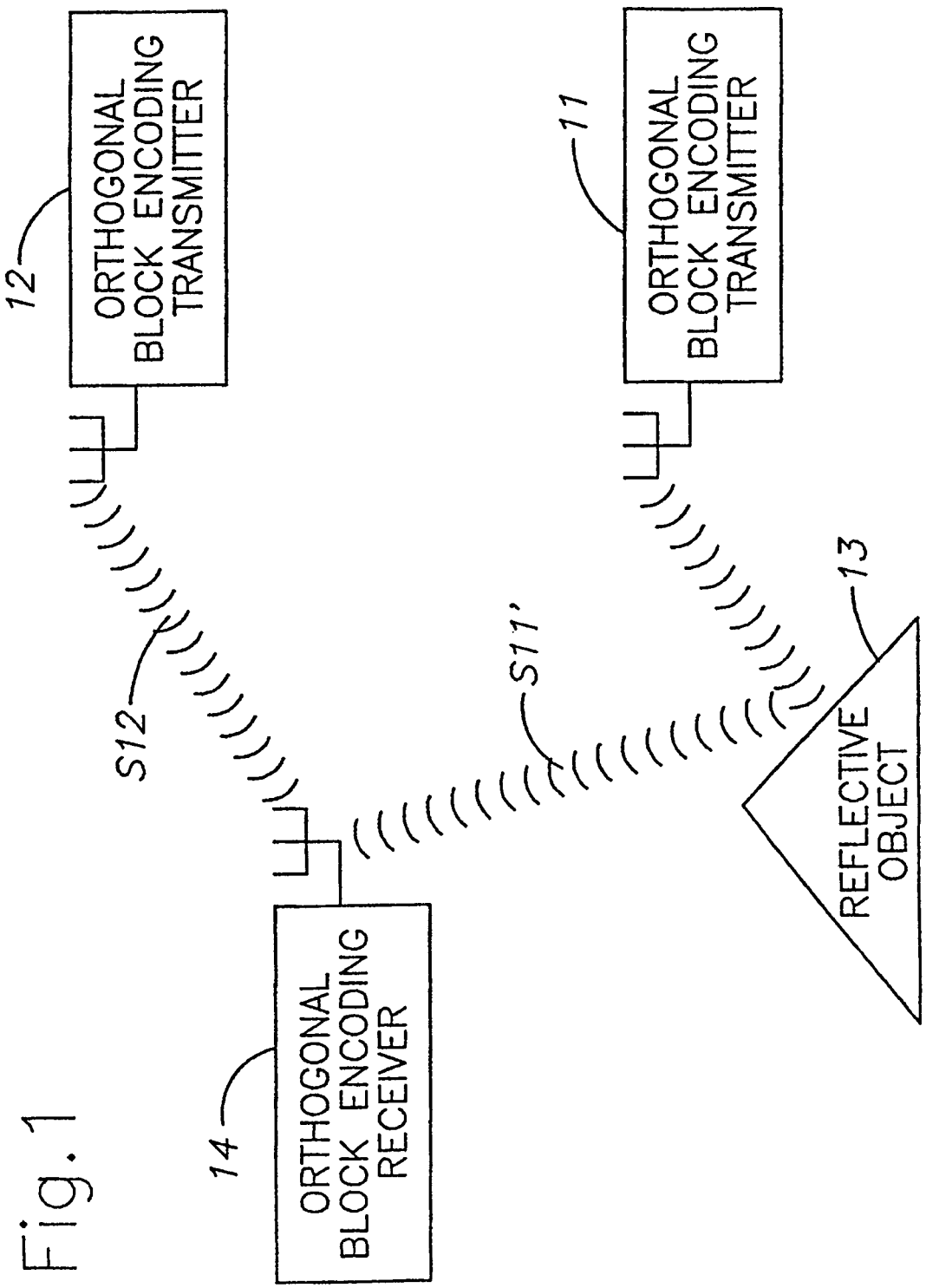
FIG. 1 is a simplified functional block diagram of an orthogonal block encoding communication system of the present invention.

Referring to FIG. 1, an orthogonal block encoding communication system 10 of the present invention is seen to include a plurality of transmitters exemplified by an pair of substantially identical block encoding transmitters 11 and 12 which broadcast information carrying signals S11 and S12 in the form of electromagnetic waves. Preferably these signals S11 and S12 are digital signals, although the invention contemplates and is usable with analog signals modulated onto a carrier wave. These signals S11 and S12 are received by an orthogonal block encoding receiver 14 which decodes the orthogonally block encoded signals and separates them into separate output channels. A portion of the orthogonally block encoded signal S11 from transmitter 11, as shown with a dotted line, reaches the receiver 14 via an indirect path by reflecting off of a reflective object 13 on the landscape. Because the length of the reflective path is greater than the length of the direct path of the signal S12 the reflected signal S11' arrives at the receiver 14 at a time later than the arrival of directly received signal S12. Accordingly, even if signal S12 is synchronized to arrive at the receiver simultaneously with the arrival of signal S11, it will not be synchronized with the reflected signal S11'.

Figure 2:
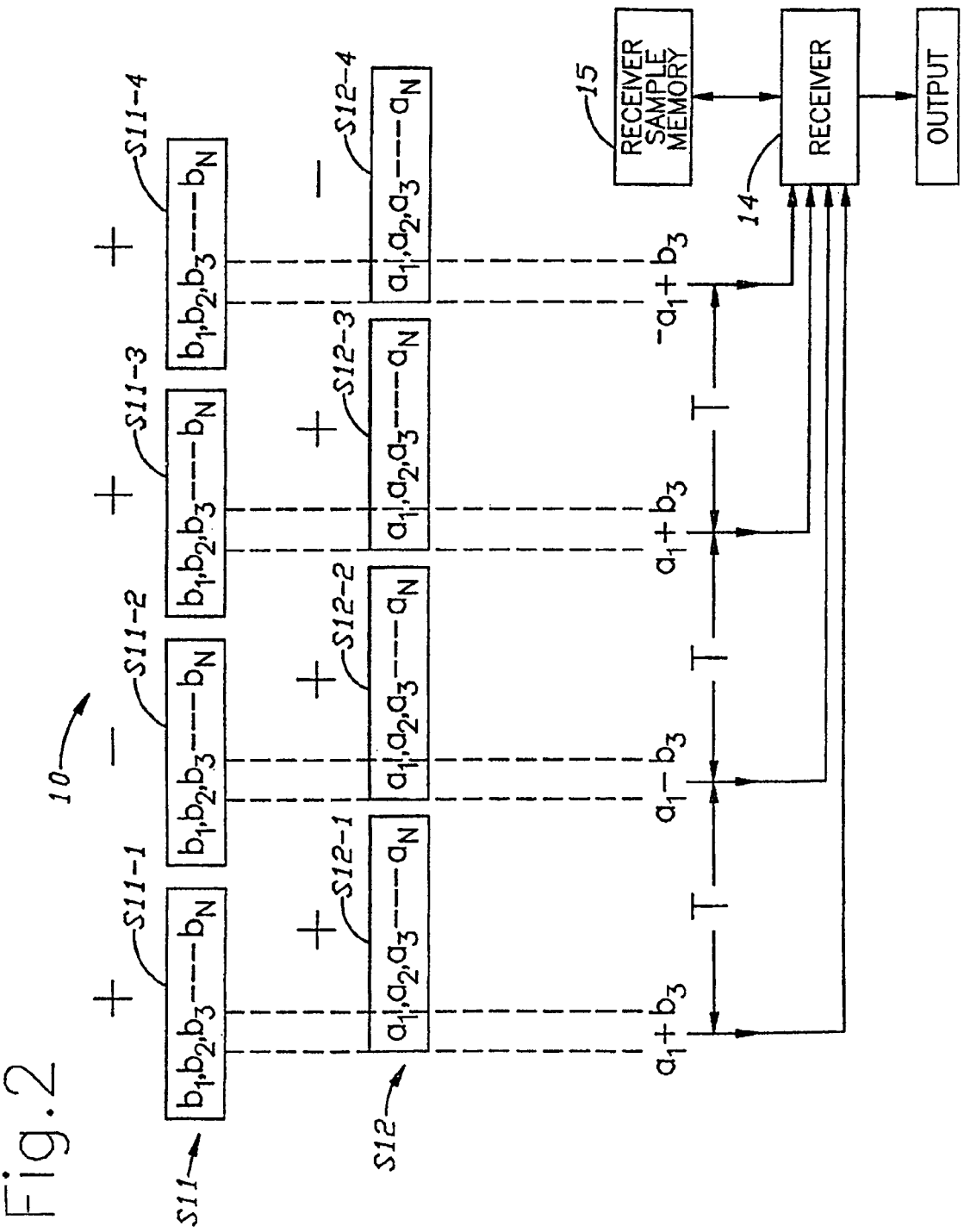
FIG. 2 is an illustration of two of the orthogonally block encoded signals received at the receiver of the system of FIG. 1 which are nonsynchronized by an amount to which the orthogonal block encoding receiver is entirely insensitive.

Referring to FIG. 2, an orthogonal block encoding communication system 10 is shown. The first signal S11, comprises blocks of N information-bearing samples $b_1, b_2, b_3 \ldots b_N$ which are repeated a number of times with inversion indicated by a minus sign or without inversion denoted by a plus sign over each block. Thus, as shown in FIG. 2, S11-1, S11-3, and S11-4, the first, third and fourth blocks are not inverted, while the second block S11-2 is inverted. The inversion/non-inversion pattern for FIG. 2 is therefore represented by the sign pattern +−++.

The second signal S12 comprises a block of signal samples $a_1, a_2, a_3 \ldots a_N$ which is also repeated with or without an inversion. In the case of the second signal S12, there is no inversion for the first, second and third repeats, but inversion of the fourth repeat, represented by the sign pattern +++−.

It may be verified that the first and second signals' sign patterns +−++ and +++− are orthogonal, which means that they agree in as many places as they disagree.

When the first signal S11, and second signal S12, are both transmitted at the same time, linear addition of signal samples occurs in the aether. However, as shown in FIG. 2, the two signals S11 and S12, or signal blocks S11-1 and S12-1, are not necessarily time-aligned. In the example of FIG. 2, the samples $a_i$ and $b_i$ are not aligned and so do not add, while samples $a_i$ and $b_{(i+2)}$ are aligned and do add.

The receiver 14 is connected to receive corresponding signal samples that are repeated in a transmission time T apart. The receiver 14 preferably converts the signal samples into a suitable form, such as numerical, which are stored in a receiver sample memory 15. The receiver 14 processes and combines corresponding signal samples received a time period T apart by reading them out of the memory 15 if they are previously received samples. At the four sample points exemplified in FIG. 2, the sum of the sample values from signals S11 and S12 are respectively $a_1+b_3$, $a_1-b_3$, $a_1+b_3$ and $-a_1+b_3$.

In combining the samples, the receiver 14 uses addition or subtraction according to the sign pattern associated with the signal. In the example of FIG. 2, the sign pattern +−++ is used to receive the first signal S11. Alternatively, the sign pattern +++− is used to receive the second signal S12.

In receiving the first signal S11 therefore, the receiver 14 forms, $+(a_1+b_3)-(a_1-b_3)+(a_1+b_3)+(-a_1+b_3)=4b_3$, which illustrates that interference from the samples $a_1$, and $-a_1$ of the second signal S12 cancel.

Alternatively, the receiver 14 combines the received samples using sign pattern +++− to form the second received signal S12, obtaining, $+(a_1+b_3)+(a_1-b_3)+(a_1+b_3)-(-a_1+b_3)=4a_1$, showing that interference from the samples $b_3$ and $-b_3$ of the first signal S11 cancels.

Figure 3:
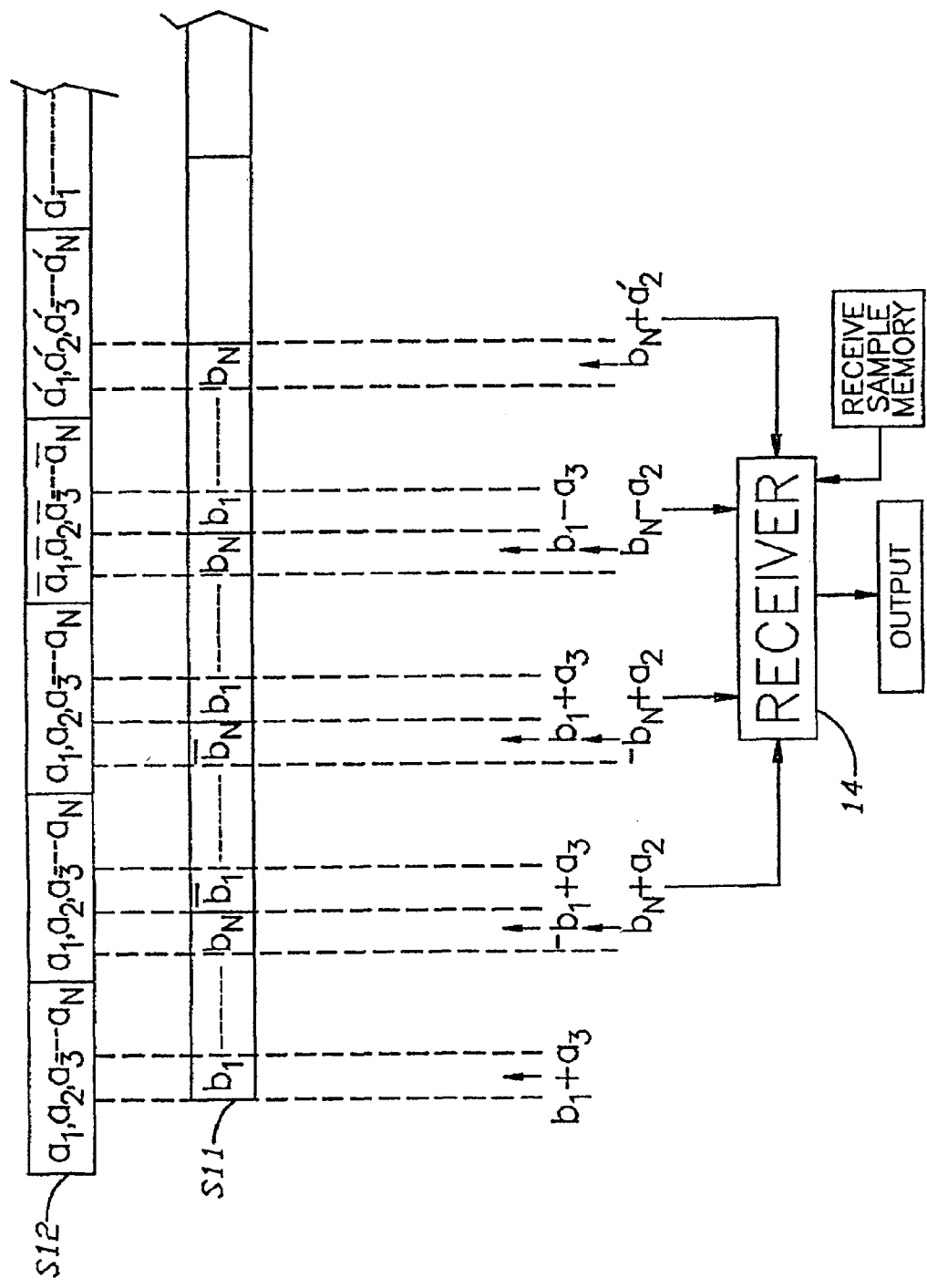
FIG. 3 is an illustration like that of FIG. 2 but showing a departure from ideal orthogonality.

Thus the two signals S11 and S12 appear orthogonal despite having a relative time misalignment of two sample intervals. The same orthogonality will hold for other time misalignments relatively small compared to the block length of N sample intervals. Departures from ideal orthogonality when practicing the invention occur for some repeated bits, the number of bits for which this occurs being equal to the time misalignment expressed in sample intervals. Thus, as shown in FIG. 3, when the block duration is large compared to the time misalignment, departures from orthogonality affect only a small fraction of the bits. The receiver 14 combines received samples to decode the samples using sign pattern +−++. For $b_1$, the interference from 'a' sample $a_3$ cancels. However, for decoding $b_N$, the receiver 14 obtains $$4b_N - a_2 + a_2'  \quad (1)$$

The interference from the 'a' samples to $b_N$ does not cancel completely because $a_2'$ is a sample from the next set of block repeats, and is not necessarily equal to $a_2$. When the number of repeats is large however, that is greater than four as in the example, the $b_N$ value will be enhanced by a large multiplier while the interference from 'a' samples will nearly cancel. Moreover, any underlying error correction coding will tolerate a few of the 'b' values being corrupted by uncancelled interference from 'a' signal values without causing transmission errors in the underlying information. Thus in practice, with large block sizes, a large number of repeats, such as the 64 repeats used in IS95, and the use of further error correction coding, the invention claims that signal orthogonality is substantially maintained even with time misalignment between different signals of several sample intervals.

Figure 4:
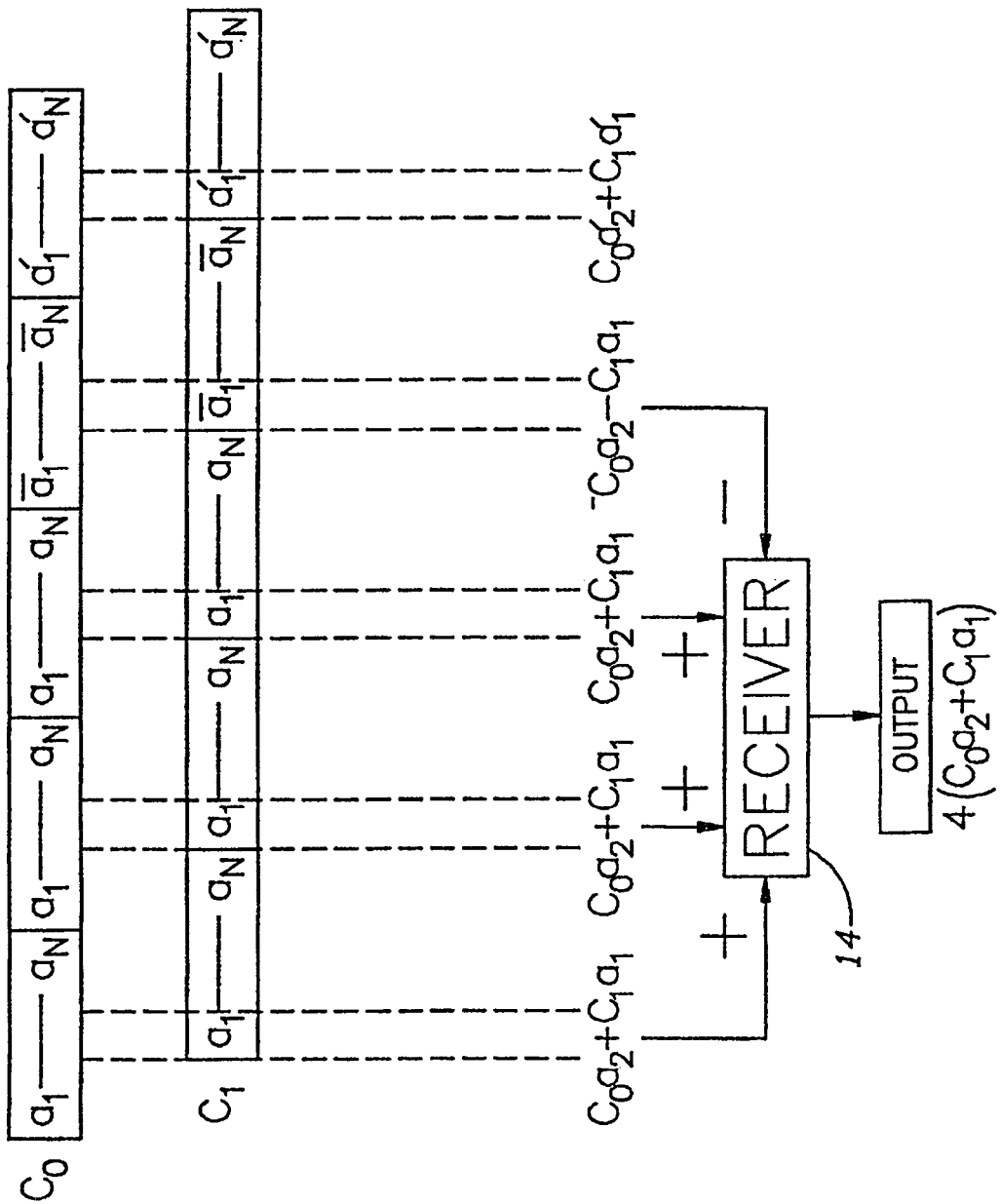
FIG. 4 is an illustration like that of FIG. 2 showing the effect of multipath propagation.

When a signal, such as the 'a' component of the second signal S12, propagates from a transmitter to a receiver over multiple propagation paths of different lengths, the signal will be received multiplied by a complex number $C_0$ representing phase and amplitude change over a first path and will be received multiplied by a complex factor $C_1$ representing the phase and amplitude of a delayed path. FIG. 4 illustrates this condition for a relative path delay of one sample interval. Thus, when decoding sample $a_2$, in addition to changes in phase and amplitude to $C_0$. $a_2$ by the first propagation path, it will be further corrupted by addition of sample $a_1$ changed in amplitude and phase by the factor $C_1$ of the second path. As shown in FIG. 4, the receiver 14 output is then $4(C_0.a_2+C_1.a_1)$, which is just four times the receiver output that would occur without repeats. The receiver 14 output is thus successively:

$$4C_0.a_1 + C_1.a_N - C_1.a_N'' \quad (2)$$

$$4C_0.a_2 + 4C_1.a_1$$

$$4C_0.a_3 + 4C_1.a_2$$

$$4C_0.a_4 + 4C_1.a_3$$

. . .

$$4C_0.a_N + 4C_1 a_{(N-1)}$$

where $a_N''$ means the Nth symbol of the previous block of N symbols. All outputs except the first depend on two transmitted samples.

The output sequence may be processed by an equalizer, such as described in the incorporated references, designed to handle delayed paths of one or more samples delay. Such an equalizer processes all samples correctly except for those at the border between two blocks, such as the first sample given by equation (2) above. Samples at the edge of blocks are handled appropriately by such an equalizer. The degree of approximation is better when the number of combined repeats 'M' is larger than four, such that the first output becomes $$M \cdot C_0 \cdot a_1 + (M-3) \cdot C_1 \cdot a_N - a_N'' = \quad (3)$$
$$M \cdot (C_0 \cdot a_1 + C_1 \cdot a_N - C_1 \cdot (a_N'' + 3 \cdot a_N)/M)$$

where the error $$C_1 \cdot (a_N'' + 3 \cdot a_N)/M$$

tends to zero in relation to $C_0.a_1+C_1.a_N$ as M becomes larger. It is possible, however, to effectively model the dependence of the receiver after combining based on three samples, $a_1, a_N$ and $a_N''$ in the above example of FIG. 4, and to construct an equalizer that uses this model in decoding $a_1$ while using a model dependent on only two transmitted samples otherwise. Such an equalizer needs to maintain a larger number of decoding states or "Viterbi states" to resolve the signal dependence on the additional symbols.

In CDMA systems, the receiver 14 of the invention thus includes despreading followed by conventional equalization for multipath propagation. In accordance with the invention, the receiver 14 may include a Viterbi Maximum Likelihood Sequence estimator form of equalizer or a Decision Feedback Equalizer (DFE), or, alternatively, a suitable RAKE receiver which accounts for multipath propagation in the despreading process. A suitable RAKE receiver is described in U.S. Pat. No. 5,305,349 issued to Dent on Apr. 19, 1994 entitled *Quantized Coherent RAKE Receiver*, which is hereby incorporated by reference.

Figure 5:
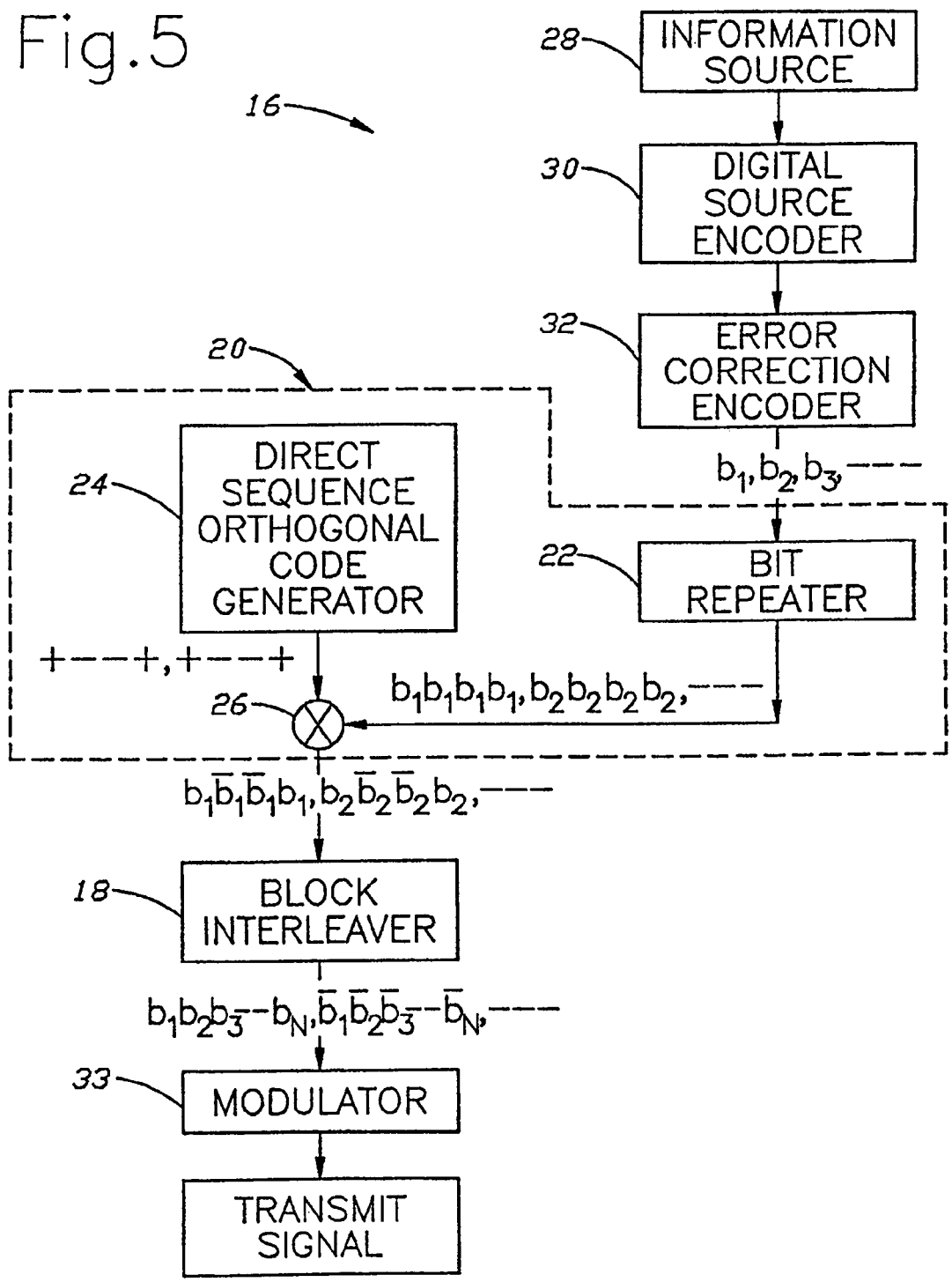
FIG. 5 is a functional block diagram of a transmitter in accordance with the invention.

A transmitter 16 in accordance with the invention is preferably constructed as shown in FIG. 5 including a block interleaver 18 which operates on the signal after a final orthogonal spread-spectrum coding operation is performed by circuit 20. The circuit 20 includes a bit repeater 22, a direct sequence orthogonal code generator 24 and a modulo-2 adder 26.

An information source 28 provides information, such as speech or facsimile signals, to a digital source encoder 30 which converts the information into digital form. The output of the digital source encoder 30 is applied to an error correction encoder 32 to render transmissions more tolerant to noise and interference. The output bit stream of the encoder 32 ($b_1, b_2, b_3 \ldots$) is spread by a bit repeater 22 which samples each bit M times where M is the desired spreading factor. By then bitwise adding, the modulo-2 adder 26 bitwise adds to the spread bit stream, a characteristic orthogonal code allocated for the signal and generated by the direct sequence orthogonal code generator 24. A M×N block interleaving operation is performed by the block interleaver 18 on the spread spectrum coded signal on output such that repeated bits are not transmitted adjacently in time but rather separated by a block size of N bits. The block interleaver 18 does not add or delete bits, but alters their order of transmission, for example, by transposing a matrix of N×M bits. Alternatively, the block interleaver 18 is a helical, diagonal or block-diagonal interleaver rather than a purely block interleaver. The spread spectrum coded block signal is then applied to a radio frequency carrier by means of a modulator 33.

The transmitter 16 of FIG. 5 is formed by adding an interleaver 18, having precise parameters (M,N) adapted to the spread spectrum code produced by the generator 24, to result in a CDMA transmitter according to the invention.

Figure 6:
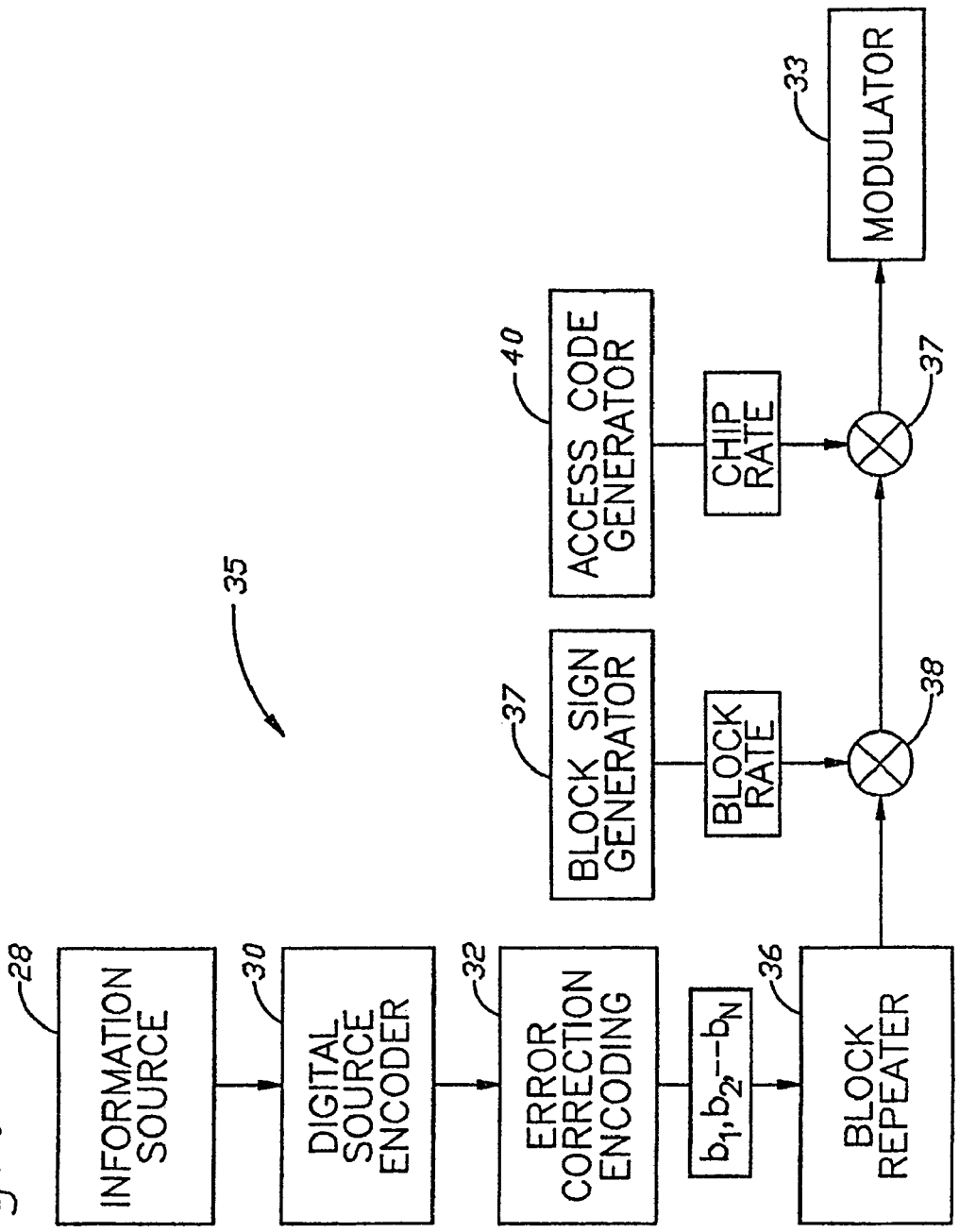
FIG. 6 is a functional block diagram of an alternative transmitter arrangement in accordance with the invention.

FIG. 6 shows an alternative transmitter 35 in accordance with the invention which includes the information source 28, digital source encoder 30 and error correction encoder 32.

The embodiments shown in both FIGS. 5 and 6 can include further interleaving over and beyond the interleaving performed by the interleaver 18, the purpose of the further interleaving being to avoid errors in the same sample block appearing consecutively at the error correction decoder at the receiver 14. Any such additional within-block interleaving is considered to be part of the error correction coding process.

The output from the error correction encoder 32 is connected to a block repeater unit 36 which saves a block of N consecutive bits and then repeats the block M times. A block sign generator 37 selectively supplies a sign for each repetitive block. Thus, block sign generator 37 only needs to generate orthogonal codes at the block rate, not at the rate at which signal samples are generated or a "chip rate." The sign from block sign generator 37 is combined with signal samples, such as bit $b_3$ from the block repetition unit 36 using an exclusive-OR or modulo-2 adder unit 38. Alternatively, a module-2 adder is used. A chip-rate scrambling code is produced from an access code generator 40 to randomize the output bit stream from the block sign adder 38. The code produced by the access code generator 40 must be the same for all signals that are orthogonal, such as signals in the same cell of a cellular telephone system.

The access code generator 40 can operate in a number of different embodiments. In a first embodiment, the use of the access code generator 40 is optional, and may be omitted in some systems. Signals which are orthogonal to each other are then generally transmitted in the same cell. If spare orthogonal codes not already allocated in a cell are available, they can advantageously by employed in neighboring cells such that a proportion of the neighboring cell interference is eliminated. CDMA systems of the prior art are not able to employ such orthogonality between cells as the transmissions of one cell cannot be synchronized with the transmissions of neighboring cells. However, when practicing this invention, lack of precise synchronization is not an impediment to orthogonality between cells. If, however, the entire set of mutually orthogonal codes is used in a first cell, then a neighboring cell uses a second set of codes, orthogonal to each other but non-orthogonal to the first cells' codes. Such an additional set of codes preferably has controlled non-orthogonality with any other set of codes, as may be obtained by using the technique of the above-referenced U.S. Pat. No. 5,353,352 which may be embodied in block sign generator 37.

In a second embodiment, the access code generator generates a chip-rate code of length equal to the block length and repeats it for the repeated blocks. The code is then changed for the next set of repeated blocks, and so-on. The property afforded by this second technique is that multipath signals delayed by a few chips are despread by the same sign pattern produced jointly by access code generator 52 and block sign generator 54 in the receiver of FIG. 7. Thus multipath propagation causes additive intersymbol interference between the despread symbols output by averager 58, which may be resolved by the exemplary maximum likelihood equalizer 60. The access code is preferably the same for all signals in the same cell while a different access code is employed for signals in different cells. The access code is preferably chosen according to the technique disclosed in U.S. Pat. No. 5,353,352 to achieve controlled non-orthogonality between cells.

In a third embodiment, the access code generator 40 is chosen to render multipath delayed signals orthogonal to non-delayed signals. This is achieved by applying like sign changes to any pair of adjacent chips in half of the block-repeats and unlike sign changes in the other half of the block-repeats. This has the effect that delays of +/−one chip relative to a nominal propagation delay result in multipath signals which are orthogonal to the nominal propagation path. The multipath signals are then not orthogonal but rather identically coded to another signal's code. This option is thus preferably used when only half the available codes are employed for discriminating between signals in the cell and the other half of the orthogonal codes are those which appear on +/−one chip-delayed multipath and thereby discriminate the multipath.

In a fourth embodiment, the access code generator 40 is a random code generator or none of the above. Then multipath signals are neither orthogonal to, nor identically coded with undelayed signals. If it is desired to demodulate multipath signals, then a RAKE type of equalizer may be employed, in which the receiver despreads the received signal using different time-shifted outputs of access code generator 52 and performs different averages for each using multiple instances of averager 58 to yield multiple averages each corresponding to signal ray of different propagation delay. The different rays are then combined in a RAKE equalizer such as the RAKE receiver using coarsely quantized coefficients as described in the above-referenced U.S. Pat. No. 5,305,349. This fourth embodiment is preferably not suggested for application where degeneration of code orthogonality is affected by relative propagation delay differences or synchronization errors.

Advantageously, groups of signals that are not orthogonal, such as signals in different cells of a cellular wireless telephone system, are provided with different codes.

Figure 7:
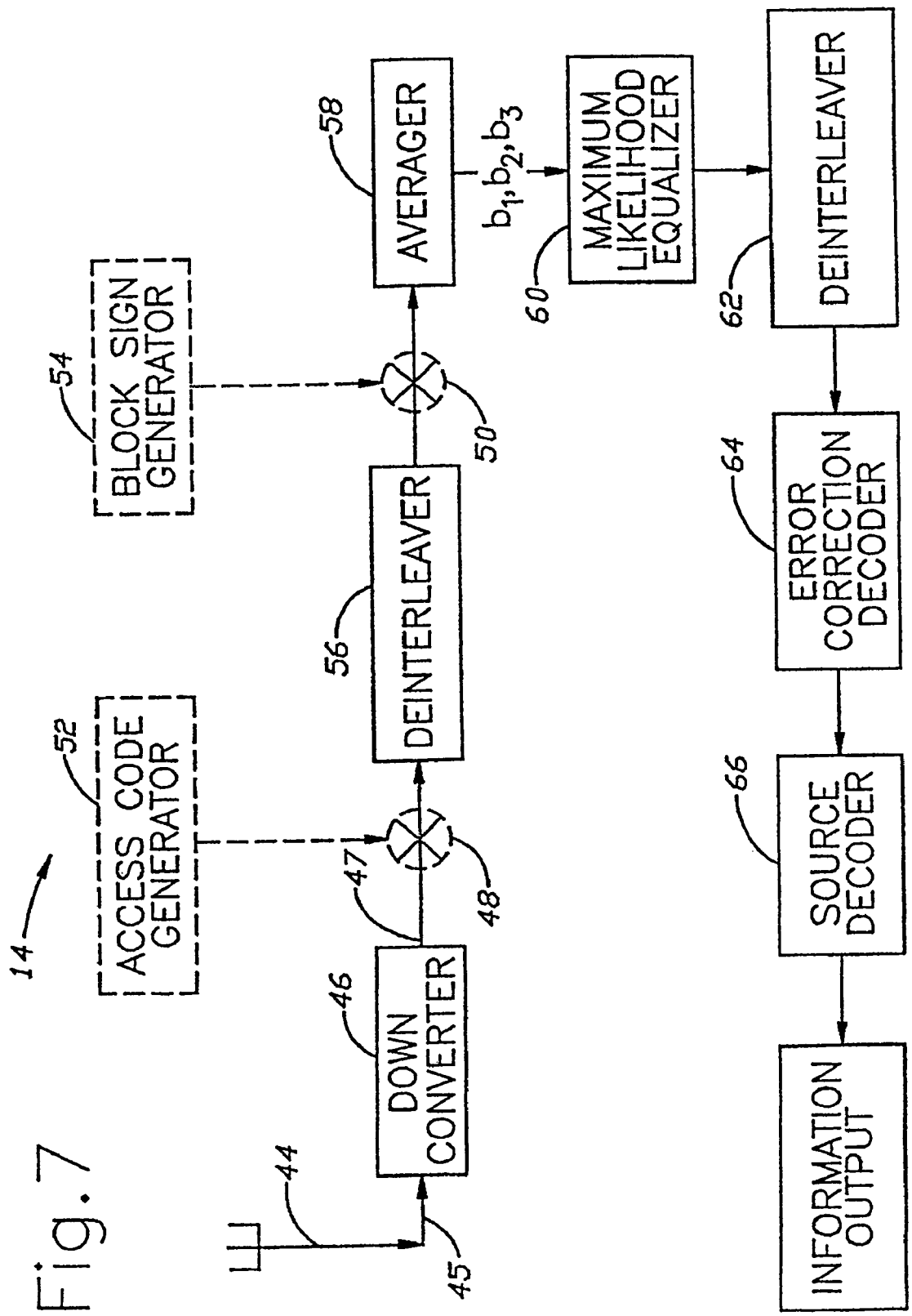
FIG. 7 is a functional block diagram of a receiver in accordance with the invention.

The receiver 14 of FIGS. 2, 3, and 4 is preferably constructed in accordance with the invention as shown in FIG. 7. Signals including desired signals, interfering signals, noise and multipath distortion signals are received from an antenna 44 and applied to an input 45 of a downconverter 46. The downconverter 46 downconverts the radio frequency signal to a signal suitable for processing, preferably a complex baseband signal. Complex baseband signals may be in Cartesian (X,Y) form having an X, or "I", real component and a Y, or "Q" imaginary component, or polar form (R,THETA) or Logpolar form (log(R),THETA) as described in U.S. Pat. No. 5,048,059, issued to Dent on Sep. 10, 1991, entitled *Logpolar Signal Processing*, the disclosure of which is hereby incorporated by reference. The downconverted samples from output 47 of the downconverter 46 are then applied to a sign changer 48 which is connected to an access code generator 52. The downconverted samples 47 are then sign-changed by the adder 48 according to the sign pattern of an access code provided to the access code generator 52, to remove the access code applied by a corresponding transmitter code generator such as access code generator 40 in FIG. 6. When different codes are applied to I and Q samples at the transmitter 16, FIG. 5, corresponding codes are used for I and Q samples, respectively, at the receiver 14, in FIG. 7.

The real I and imaginary Q components of the samples from the sign changer 48 are deinterleaved by a deinterleaver 56 which functions by blocking together all chips corresponding to repeats of the same signal sample information bit. The individual repeat signs are made the same by applying sign changes in the sign changer 50 according to one of a set of orthogonal sign patterns supplied by a block sign generator 54. Alternatively, block descrambling is performed using the access code generator 52. It will be appreciated that two changes of sign, in the sign changers 48 and 50 respectively, are equivalent to a single change of sign determined by the product of the separate signs. Therefore, it does not matter whether the net sign change is applied before or after deinterleaving as long as the access code generator 52 or block sign generator 54 or a combination thereof generates the appropriate sign sequence.

After the repeats are blocked together and the signs of all repeats are equalized, the repeats are combined together by an averager 58 which preferably averages or adds all repeats in a window of M bits, where M is the number of repeats. Alternatively, the averager 58 is a low pass filter of bandwidth similar to that of a block moving averager. The output of averager 58 is then downsampled from M samples per bit to one sample per bit to yield the bit series $b_1, b_2, b_3$ .... These samples may contain Intersymbol Interference (ISI) due to multipath propagation, so they are next fed to a maximum likelihood equalizer 60. Output values from the equalizer 60 are preferably in "soft" form in which 1's and 0's are represented by a value indicative of the degree of "oneness" or "zeroness" rather than hard 1/0 decisions. U.S. Pat. No. 5,099,499 issued to Hammar describes deriving soft decisions, the disclosure of which is hereby incorporated by reference. Use of soft decisions improves the performance of an error correction decoder 64 which receives equalized signals and produces hard decisions and "bad frame" indicators to source decoder 66. The source decoder 66 translates the output bitstream to, for example, speech signals and uses the bad frame indicators from the error decoder 64 to mask error events, and to prevent noise bursts from corrupting perceived speech quality. Further, a deinterleaver 62 is used between the equalizer 60 and the error correction decoder 64 if a corresponding interleaver is used at the transmitter 16. The deinterleaving by the deinterleaver 62 is not related to the use of the deinterleaver 56 to improve orthogonality under conditions of timing error or multipath.

Commonly assigned U.S. patent application Ser. No. 08/305,727 of Dent, entitled *Simultaneous Demodulation and Decoding Device* filed Sep. 14, 1994, discloses a decodulation technique which performs all the functions of the equalizer 60, the deinterleaver 62 and the error correction decoder 64 and may be used in lieu of these individual units. This disclosure is hereby incorporated by reference.

Small departures from true orthogonality that remain for some transmitted symbols when transmitters are not exactly synchronized are such as described by equation (1). For example, a joint demodulation method for two signals can proceed as follows:

If the signals $b_N$ and $a_2$ are described as belonging to a vector $\underline{V}(i)$ of current symbols to be demodulated $$\underline{V}(i) = \begin{bmatrix} bN \\ a2 \end{bmatrix}$$

where $$\underline{V}(i+1) = \begin{bmatrix} bN' \\ a2' \end{bmatrix}$$

and and $\underline{V}(i-1)$ is likewise composed of $b_N''$ and $a_2''$ from previous blocks of N transmitted symbols, then upon combining repeats first with the sign pattern for 'b' symbols and then for 'a' symbols we obtain sums $S_a$ and $S_b$ as follows:

$$S_b = 4b_N - a_2 + a_2'$$

$$S_a = 4a_2 - b_N + b_N'' \text{ or}$$

$$\underline{S} = \begin{bmatrix} Sb \\ Sa \end{bmatrix} = \begin{bmatrix} 0 & 0 \\ 1 & 0 \end{bmatrix} \cdot \underline{V}(i-1) + \begin{bmatrix} 4 & -1 \\ -1 & 4 \end{bmatrix} \cdot \underline{V}i + \begin{bmatrix} 0 & 1 \\ 0 & 0 \end{bmatrix} \cdot \underline{V}(i+1) \quad (4)$$

When all signals are to be demodulated, as in a cellular base station or satellite ground station, such remaining non orthogonality can be entirely compensated by joint demodulation, decision feedback, or alternatively the subtractive demodulation method of U.S. Pat. No. 5,151,919 which was incorporated by reference herein above.

Thus, the sum vector $S_b$, $S_a$ which should be $4\underline{V}i$ is corrupted by a small amount of the previous vector $\underline{V}(i-1)$ and the next vector $\underline{V}(i+1)$, the amounts being described by "Intervector Interference" (IVI) coefficients which are matrices M0, M1 and M2 in the following equation:

$$\underline{S}=M0.\underline{V}(i-1)+M1.\underline{V}i+M2.\underline{V}(i+1) \qquad (5)$$

The center term is descrambled by multiplying equation (4) by the inverse of the matrix M1

$$\begin{bmatrix} 4 & -1 \\ -1 & .4 \end{bmatrix}^{-1} = \begin{bmatrix} 4/15 & 1/15 \\ 1/15 & 4/15 \end{bmatrix}$$

to obtain $$\underline{S}'(i) = \begin{bmatrix} 1/15 & 0 \\ 4/15 & 0 \end{bmatrix} \cdot \underline{V}(i-1) + \underline{V}i + \begin{bmatrix} 0 & 4/15 \\ 0 & 1/15 \end{bmatrix} \cdot \underline{V}(i+1) \qquad (6)$$

which is equal to equation (4) multiplied by M1$^{-1}$.

The effect of the previous vector $\underline{V}(i-1)$ and the next vector $\underline{V}(i+1)$ may be approximately removed by using $\underline{S}'(i-1)$ and $\underline{S}'(i+1)$ computed using equation (6) and substituting them into equation (6) to obtain an improved estimate $\underline{S}'(i)$ of $\underline{V}(i)$. This process is iterated to the extent needed to obtain the accuracy desired.

However, more generally, IVI expressed by equation (5) is unscrambled by use of a matrix transversal equalizer described by $$\underline{S}'(i) = \sum_{j=-L}^{j=+L} [H(j) \cdot \underline{V}(i+j)]$$

where L is selectively sized and the equalization matrices H(j) are chosen to obtain the desired accuracy of equalization.

It is not necessary to over complicate the process of compensating for residual non-orthogonalities when only a few of the N symbols per block are affected, particularly when the symbols are further processed by an error correction decoder. It may suffice to accord those symbols which are affected by residual non-orthogonality a soft value indicative of greater symbol uncertainty before applying them to the error correction decoder.

The present invention is capable of operating with any number of block repeats and not just the power of two for which Walsh-Hadamard sign patterns form orthogonal sets. This ability to generalize the invention relies on the fact that a radio signal is capable of being changed in phase by any desired amount and not just by inverting it 180 degrees. A general phase shift of, for example, 120 degrees can be made and can be represented by multiplication by the complex factor:

$$S = \mathrm{EXP}(j2\pi/3).$$

Presuming that a block of symbols is to be transmitted in three repeats in accordance with the invention, a first transmitter transmits its symbol blocks with successive phase shifts of 0, 120, and 240 degrees applied to the three block repeats. Using the symbols where $S_0, S_1, S_2$, represent 0, 120 and 240, respectively.

$S_0=1$, $S_1 = \mathrm{EXP}(j2\pi/3)$, and $S_2 = P(j4\pi/3) = \mathrm{EXP}(-j2\pi/3)$, a first transmitter transmits $S_0.(b_1,b_2,b_3 \ldots b_N)$; $S_1.(b_1,b_2, b_3 \ldots b_N)$; $S_2.(b_1,b_2,b_3 \ldots b_N)$; where $(b_1,b_2,b_3 \ldots b_N)$ stands for the block of symbols modulated without a phase shift. A second transmitter transmits $S_0.(a_1,a_2 \ldots a_N)$; $S_2.(a_1,a_2 \ldots a_N N)$; $S_1.(a_1,a_2 \ldots a_N)$; where $(a_1,a_2 \ldots a_N)$ represents its modulated symbol block, and a third transmitter transmits $S_0.(C_1,C_2 \ldots C_N)$; $S_0.(c_1,c_2 \ldots C_N)$; $S_0.(c_1, c_2 \ldots C_N)$, where $(c_1,c_2 \ldots c_N)$ is the third transmitter's modulated symbol block.

The three transmissions are orthogonal because the sequences $S_0,S_0,S_0,S_0,S_0,S_0 \ldots$;
$S_0, S_1,S_2,S_0,S_1,S_2 \ldots$; and
$S_0, S_2,S_1, S_0,S_2, S_1 \ldots$;

are mutually orthogonal even when time-shifted. Such mutually orthogonal sequences of complex numbers may be called Fourier sequences and can be of any repeat length L of symbols by forming them as successive powers of EXP (j2π/mL).

The simpler, real-valued Walsh-Hadamard codes are used when the number of repeats L is a power of two.

In accordance with one aspect of the invention, other orthogonal sequences may also be constructed, for example by allowing a set of sequential multipliers for the successive repeats to be neither complex nor restricted to binary values of +/−1. In particular, when the multipliers are chosen to be 1 or 0, the orthogonal sequences 100000010000000100000 . . .
010000001000000010000 . . .
001000000010000000100 . . .
000100000001000000010 . . .
000010000000100000001 . . .
000001000000010000000 . . .
000000100000001000000 . . .

arise, which in fact describe an 8-slot TDMA system in which each signal is transmitted in the slot in which a '1' occurs and not in which a '0' occurs. Thus, a TDMA system is reproduced as a special case of the of delay-insensitive orthogonal Code Division Multiple Access system of the present invention. Likewise when complex weights are selected from orthogonal Fourier sequences, when symbol blocks such as $(b_1,b_2,b_3 \ldots b_N)$ represent N-fold repeats of the same symbol 'b', and when each transmitter output signal is smoothed using a filter, the invention in this special case provides FDMA signaling in which different transmissions are mutually orthogonal independent of relative delay or mistiming by virtue of occupying different, unrelated frequency channels.

Figure 8A:
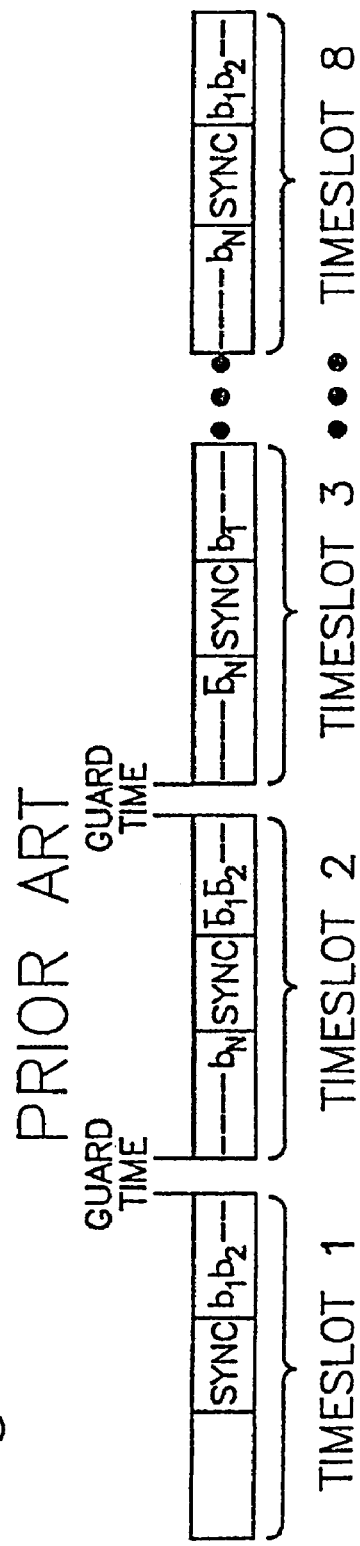
FIG. 8($a$) shows a prior art GSM TDMA burst and format of data bits.

In accordance with another aspect of the invention, TDMA and FDMA systems can be reproduced as special systems and delay-insensitive orthogonal CDMA modes may be added to FDMA or TDMA systems by modification of their coding methods. Referring to FIG. 8(a), a prior art GSM TDMA signal burst and frame format consists of eight time slots, each of which contains a signal burst having components of a syncword surrounded by data bits. In standard GSM, the data bits in each of the eight timeslots belong to a different communications link or telephone call. Evolution of GSM to permit one link to use multiple timeslots provides higher user bit rates, in which case the data bits in successive slots can be from the same communications link or call.

Figure 8B:
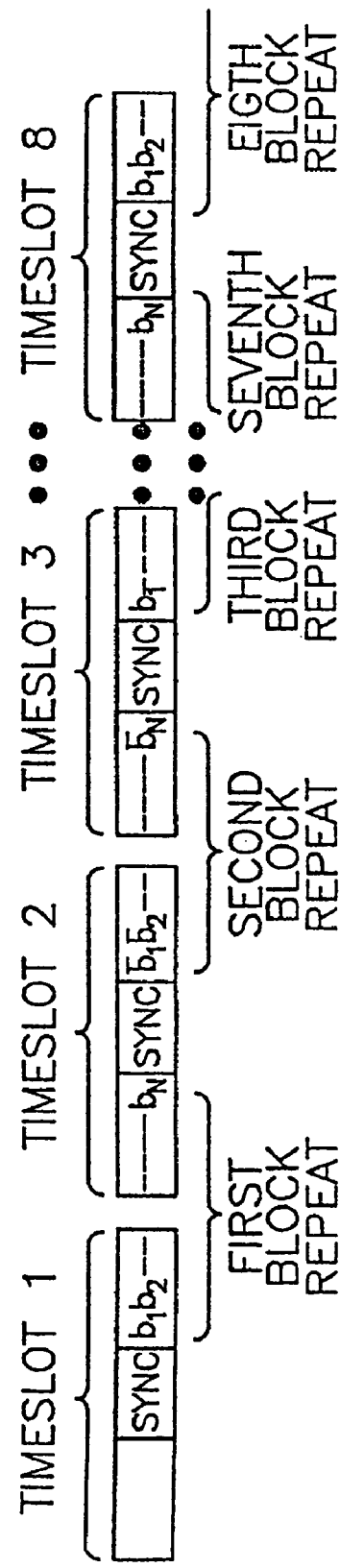

Alternatively, FIG. 8(b) shows how, in accordance with the invention, the same data bits of FIG. 8(a) may be repeated successively with or without a phase inversion or phase change to form a delay-insensitive orthogonal CDMA signal. In FIG. 8(b), the positioning of each repeat preferably straddles two signal bursts, which advantageously avoids the guard time occurring between time slots and prevents a block from being split by a syncword. This has a positive effect on how well orthogonality is preserved under mistiming conditions, and also avoids the need to apply the orthogonal phase change sequence to the syncwords S. When a block straddles two time slots, the block is split by the guard time where zero energy is transmitted and not by the syncwords. This results in less reduction of orthogonality under mistiming as the zero energy symbols of the guard time cause less interference than the full energy symbols of the syncword, when they overlap data symbols.

Other arrangements of the repeats within the bursts can of course be used, and it is not necessary to have eight repeats. For example, using Fourier sequences, seven repeats could be used with the eighth timeslot being used for receiving in the mobile terminal, to avoid a duplexing filter to connect the transmitter and receiver to the same antenna at the same time.

Those skilled in the art who now have the benefit of the present disclosure will appreciate that the present invention may take many forms and embodiments. Some embodiments have been presented so as to give an understanding of the invention. It is intended that these embodiments should be illustrative, and not limiting of the present invention. Rather, it is intended that the invention cover all modifications, equivalents and alternatives falling within the spirit and scope of the invention as defined by the appended claims.

What is claimed is:

1. A method for communicating between a plurality of transmitters and a receiver, said method comprising:
   orthogonally encoding information signals at each transmitter, said orthogonally encoding comprising:
      coding information signals at said transmitter to produce corresponding information blocks containing coded information symbols;
      repeating each information block a predetermined number of times according to a predetermined spectrum-spreading factor;
      orthogonally encoding said repeated information blocks by applying a modification factor to each repeat of said information blocks, the sequence of modification factors applied to successive repeats of said information blocks forming one of a set of mutually orthogonal coding sequences; and
   transmitting said orthogonally encoded information signals from said plurality of transmitters.

2. The method according to claim 1 further comprising decoding said orthogonally encoded information signals by employing different orthogonal codes respectively for separating the information blocks corresponding to different information signals into corresponding separate channels.

3. The method of claim 2 wherein decoding said orthogonally encoded information signals comprises removing orthogonal encoding from said encoded information blocks and adding corresponding ones of said information symbols in repeated information blocks.

4. The method according to claim 3 wherein removing said orthogonal encoding form said encoded information blocks comprises forming a summed signal for each symbol within the repeated information blocks and processing the summed signal with an equalizer.

5. The method of claim 1 wherein applying a modification factor to each repeat of said information blocks comprises imposing a sequence of phase changes onto said repeated information blocks.

6. The method of claim 1 wherein applying a modification factor to each repeat of said information blocks comprises imposing a sign change on said repeated information blocks.

7. A receiver to receive a transmitted signal comprising repeated information blocks that have been orthogonally encoded, said receiver comprising:
   a receiver circuit to receive an orthogonally encoded information signal comprising at least one repeated information block; and
   a decoder to decode said orthogonally encoded repeated information block, said decoder comprising:
      an orthogonal code remover for removing the orthogonal encoding from said repeated information blocks; and
      an adder for adding corresponding ones of said symbols in said repeated information blocks after the orthogonal encoding is removed by said orthogonal code remover to form a summed signal for each symbol within said repeated information blocks.

* * * * *